United States Patent
Cartoni

(10) Patent No.: US 6,550,726 B1
(45) Date of Patent: Apr. 22, 2003

(54) MODULE FOR ADJUSTMENT OF INTENSITY OF PANORAMIC MOVEMENTS ALONG THE HORIZONTAL AND VERTICAL PLANE, PARTICULARLY IN A SUPPORTING HEAD FOR TELEVISION OR MOTION-PICTURE CAMERAS

(75) Inventor: Guido Cartoni, Rome (IT)

(73) Assignee: Cartoni S.p.A., Rome (IT)

( * ) Notice: Subject to any disclaimer, the term of this patent is extended or adjusted under 35 U.S.C. 154(b) by 0 days.

(21) Appl. No.: 09/604,092

(22) Filed: Jun. 27, 2000

(30) Foreign Application Priority Data

Jul. 16, 1999 (IT) .......................... RM99A0450

(51) Int. Cl.$^7$ .............................................. F16M 11/14
(52) U.S. Cl. ..................... 248/183; 248/187.1
(58) Field of Search .............. 248/183, 187.1, 248/176.1, 177.1, 180.1

(56) References Cited

U.S. PATENT DOCUMENTS

| | | | | |
|---|---|---|---|---|
| 1,238,477 A | * | 8/1917 | Severy ..................... 192/58.41 |
| 3,362,510 A | * | 1/1968 | Nash ........................... 188/90 |
| 3,552,699 A | * | 1/1971 | Baker ......................... 248/183 |
| 4,226,303 A | * | 10/1980 | Thoma ....................... 188/1 B |
| 4,899,854 A | * | 2/1990 | Cartoni ....................... 188/290 |
| 4,955,568 A | * | 9/1990 | O'Connor et al. .......... 248/183 |
| 5,366,193 A | * | 11/1994 | Lindsay ...................... 248/183 |
| 5,389,972 A | * | 2/1995 | Cartoni ....................... 348/373 |
| 5,413,295 A | * | 5/1995 | Ishikawa ..................... 248/183 |
| 5,419,520 A | * | 5/1995 | Ishikawa ..................... 248/183 |
| 5,540,408 A | * | 7/1996 | Ishikawa ................. 248/178.1 |
| 6,176,783 B1 | * | 1/2001 | Lindsay et al. ............... 464/24 |

* cited by examiner

Primary Examiner—Ramon O. Ramirez
Assistant Examiner—Kofi Schulterbrandt
(74) Attorney, Agent, or Firm—Samuels, Gauthier & Stevens

(57) ABSTRACT

The invention relates to a module for adjustment of intensity of panoramic movements along the horizontal and vertical plane, particularly in a supporting head for television or motion-picture cameras. The module comprises a proof casing, with a centrally passing rotation axis, a first group of fixed inner disc shaped elements, coupled on the rotation axis and spaced each other by spacing means. At least two groups of movable, laminar, disc shaped elements, the elements of which are maintained spaced each other by further spacing means. The groups of movable, laminar, disc shaped elements are being provided substantially externally with respect to the first group of elements, and being contemporaneously movable with respect to the latter group and symmetrically according to the radial direction with respect to the rotation axis. Guide means for the movement of the two groups or movable, laminar, disc shaped elements. Within the proof casing is a fluid being provided to create a resistance to the movement of the movable groups with respect to the fixed group. The movable groups being able to reach, with respect to the fixed group, a completely disengaged position and a completely interengagement position of their disc shaped elements.

15 Claims, 4 Drawing Sheets

FLUID DAMPENING FORCE

MODULE FOR ADJUSTMENT OF INTENSITY OF PANORAMIC MOVEMENTS ALONG THE HORIZONTAL AND VERTICAL PLANE, PARTICULARLY IN A SUPPORTING HEAD FOR TELEVISION OR MOTION-PICTURE CAMERAS

The present invention relates to a module for adjustment of intensity of panoramic movements along the horizontal and vertical plane, particularly in a supporting head for television or motion-picture cameras.

More specifically, the invention concerns a module of the above kind allowing obtaining an optimum adjustment of the movements with respect to every known solution.

Modules for the adjustment of the intensity on the horizontal and vertical planes already exist, and they are used for shot in the movies and television field, basing their operation on the action of a fluid, particularly a siliconic fluid, provided between movable, laminar, disc-shaped elements.

They are particularly solutions wherein the relevant motion of concentric discs modifies the interfaced surface, and consequently the resistance imposed by the fluid to the motion of the head on the horizontal or vertical plane.

Said solutions, even allowing a good functionality, do not permit to have an optimum adjustment of the motion in any situation.

Recently, solutions have been suggested, providing sector or laminar discs, intersecting during their mutual motion, with transmigration of the siliconic fluid through the blades, in order to improve the action of the siliconic fluid.

Particularly, a solution exist providing a little plate module, which is the subject of a Thoma-Sachtler patent.

Further, the same Applicant has realised in the past a solution providing a labyrinth module and a solution providing a continuous module.

A last solution is that subject of the Italian Patent Application N° RM98A000507, describing a module for the adjustment of the movement intensity, particularly for a support head for television or motion-picture cameras, comprising a first outer disc-shaped element block and a second inner disc-shaped element block, said second block being centrally placed within a seat provided in said first block, and being movable with respect to said first block, in such a way to offset the respective axis, the disc-shaped elements of the first outer block interposing between the disc-shaped elements of the second block during the respective movement of the two blocks, said first and second blocks being placed inside a waterproof housing, and within said waterproof housing a fluid being provided.

In view of the above, the Applicant has realised a new solution for a module for the adjustment of the intensity of the panoramic movements able to solve all the specific problems of the known solutions, the new solution being a remarkable technical advancement.

Another object of the present invention is that of providing a solution that, with respect to the already existing systems has remarkable constructive advantages.

Further, the solution suggested according to the present invention has many advantages with respect to the known solutions.

Particularly, with respect to the plate module subject of the Thoma-Sachtler patent and to the labyrinth of the same Applicant, the inventive solution gives the opportunity of obtaining a continuous variation of the reaction intensity.

Further, with respect to the continuous module suggested in the past by the Applicant, the solution according to the present invention can be realised with very lower encumbrances in the direction perpendicular to the movement, and consequently allows a remarkable reduction of the dimensions of the whole mechanism with the same dampening intensity.

Particularly, in the dampening function of the horizontal movement of the head, the module according to the present invention allows to remarkably lower the gravity centre of the whole device, with well evident advantages for the stability of the whole assembly.

Finally, with respect to the "planetary" module described in the above mentioned patent application N° RM98A000507, the inventive module has a remarkable reduction of the size in a radial direction and further allows the optimisation of the performances with a wider variation field of the reaction intensity.

It is therefore specific object of the present invention a module for adjustment of intensity of panoramic movements along the horizontal and vertical plane, particularly in a supporting head for television or motion-picture cameras, comprising a proof casing, with a centrally passing rotation axis, a first group of fixed inner disc shaped elements, coupled on said rotation axis and spaced each other by spacing means, at least two groups of movable, laminar, disc shaped elements, the elements of which are maintained spaced each other by further spacing means, said groups of movable, laminar, disc shaped elements being provided substantially externally with respect to said first group of elements, and being contemporaneously movable with respect to the latter group, symmetrically according to the radial direction with respect to the rotation axis, guide means for the movement of said two groups of movable, laminar, disc shaped elements, within said proof casing a fluid being provided creating a resistance to the movement of the movable groups with respect to the fixed group, said movable groups being able to reach, with respect to the fixed group, a completely disengaged position and a completely interengagement position of their disc shaped elements.

Preferably, according to the invention, said movable groups comprise a series of overlapped lamellae spaced by said spacing means, said lamellae being coupled by tow pins or rivets passing through a orthogonal direction in such a way to realise a completely rigid pack interengaging with the disc shaped elements of the fist group during their axial movement.

According to the invention, two, three, four or a higher number of movable groups can be provided, even if the preferred embodiment of the invention provides four movable groups.

Further, according to the invention, the fluid employed is a high viscosity siliconic fluid.

Always according to the invention, said guide means for the movable groups can be comprised of two plates, respectively upper and lower plate, enclosing each single group, on the lower plate interference means, e.g. a pin, being provided, slidable along respective slots obtained on a lower disc, and on said upper plate interference means, e.g. a pin, being provided, slidable along respective slots, necessary to obtain radial movements.

In a particularly preferred embodiment of the module according to the invention, said slots obtained in the upper guide disc are so shaped to make said interference means covering a trajectory according a radial direction with respect to the rotate motion of said upper guide disc about the rotation axis.

Furthermore, according to the invention, during the movement, all the movable groups maintain the same distance from the rotation axis.

Always according to the invention, the movement of the movable groups is obtained by an outer cam connected with said upper guide disc by fixing elements.

In a further embodiment of the preferred embodiment of the module according to the invention, in order to optimise the performances and reach the maximum value of the resistance to the movement, the sum of the interfaced surfaces within the movable groups will be equal to the interfaced surface of the fixed group in such a way that in the position of maximum coupling, the outer profiles of the movable groups will coincide with the outer diameter of the fixed group.

The present invention will be now described, for illustrative but not limitative purposes, according to its preferred embodiments, with particular reference to the figures of the enclosed drawings, wherein.

Figure 1:
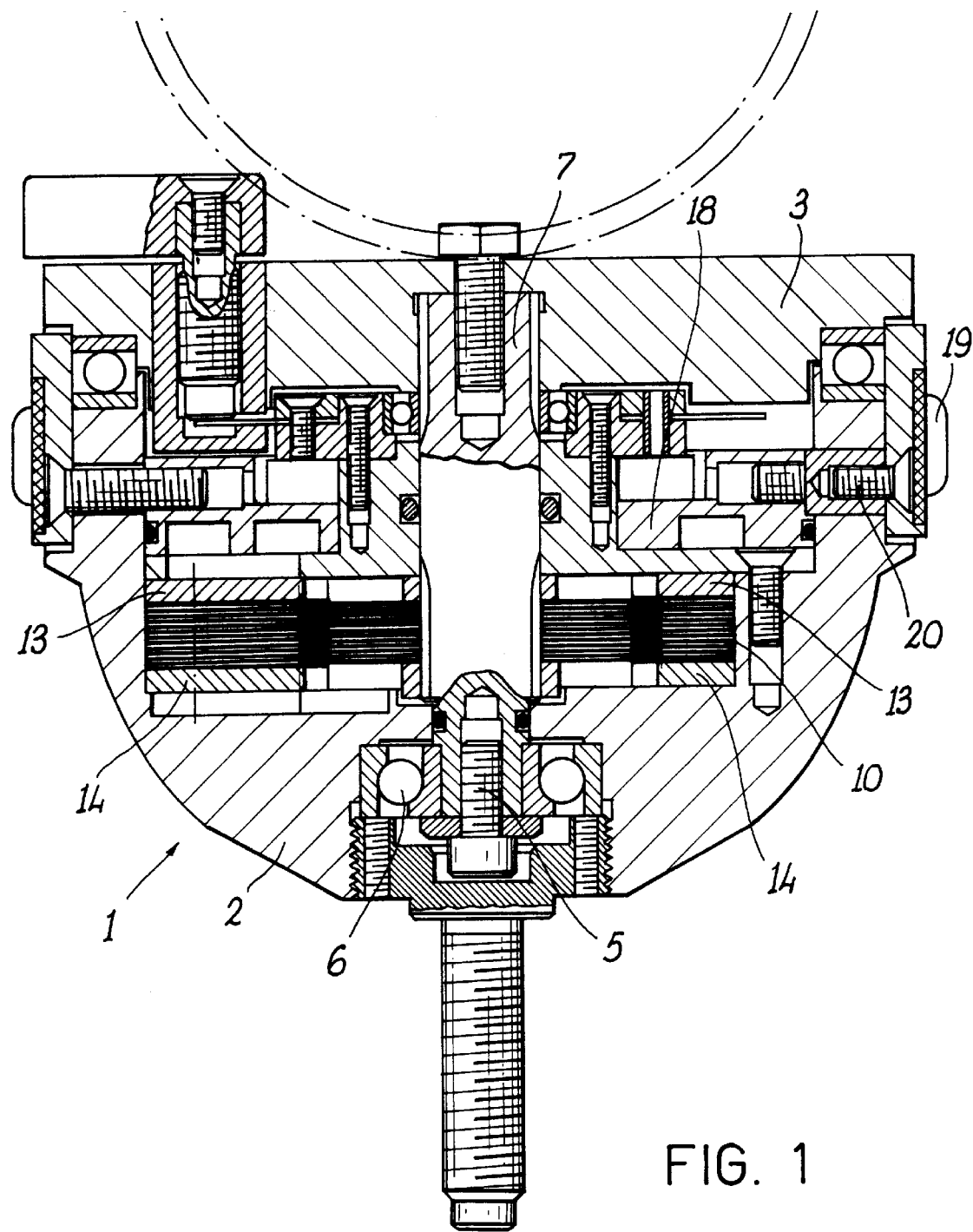
FIG. 1 is a section view of a module according to the invention.

Making reference to the figures of the enclosed drawings, it is shown a module 1 according to the present invention providing a cup 2, containing the various parts of the module 1, closed at the above by a cover 3.

Surely, said cup 2 provides a hole 4 for the passage of a screw 5 on which a bearing 6 is mounted within the cup 2. On the above, a vertical rotation axis is mounted, on which a group 8 of inner disc shaped elements is provided, coupled on said rotation axis 7 and spaced by spacers 9 with a uniform distance.

The module 1 according to the invention further provides four (in the embodiment shown in the figures) or more groups 10 which are movable contemporaneously along a radial direction, on the basis of a mechanism that will be described in the following, and symmetrically placed about the rotation axis 7.

Figure 2:
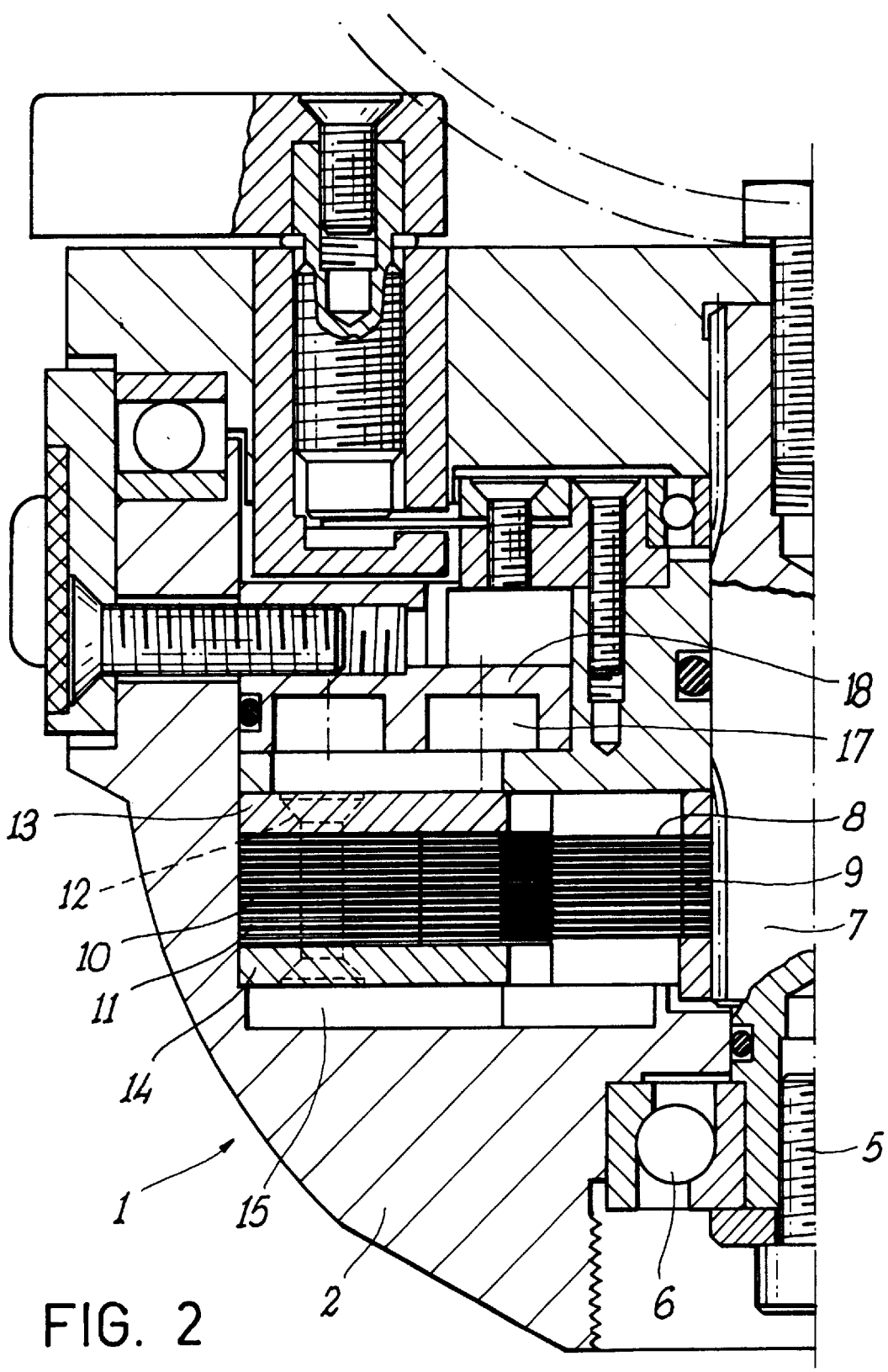
FIG. 2 is an enlarged view of a part of the module of FIG. 1.
Figure 3:
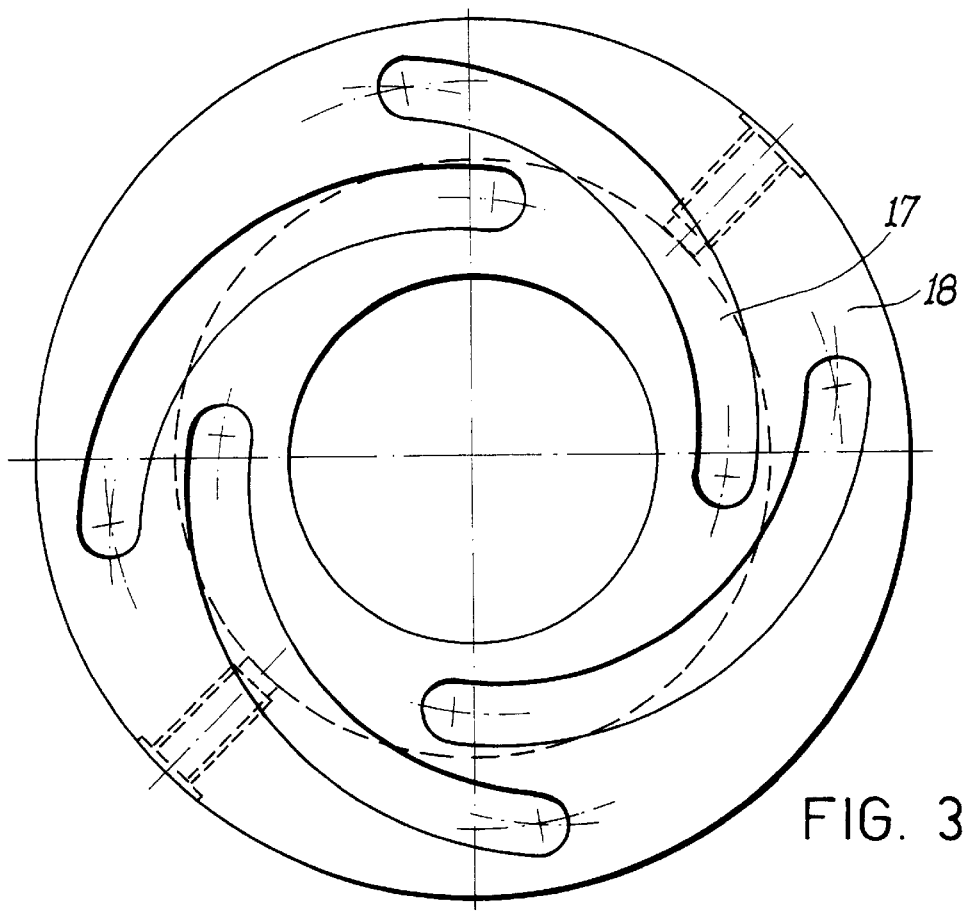
FIG. 3 is a first particular of the module of FIG. 1.
Figure 4:
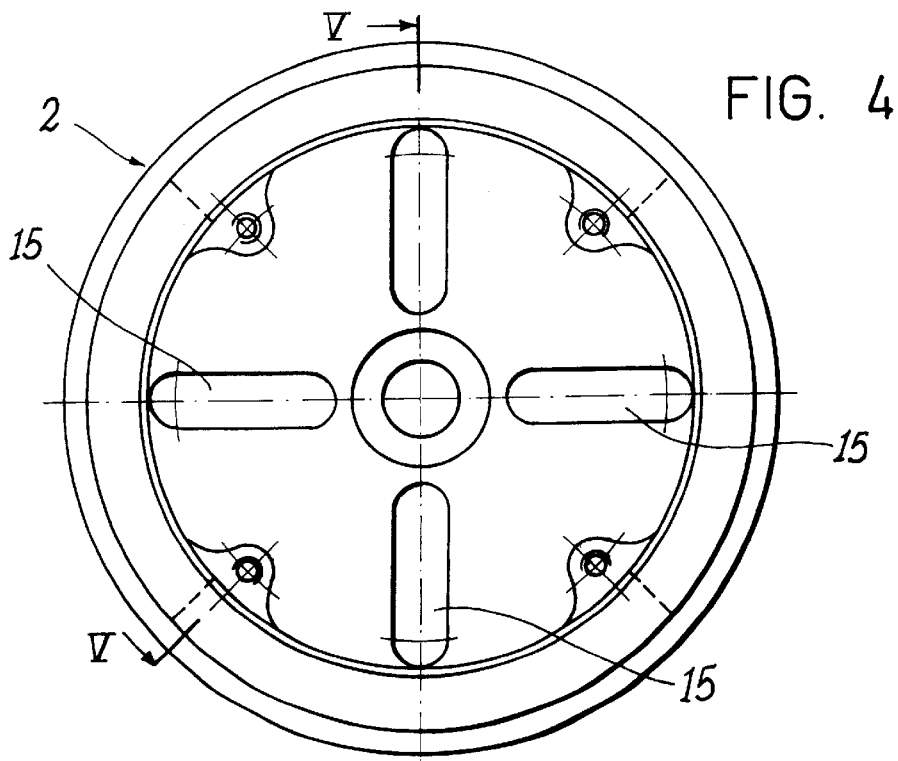
FIG. 4 is a top view of a second particular of the module of FIG. 1.
Figure 5:
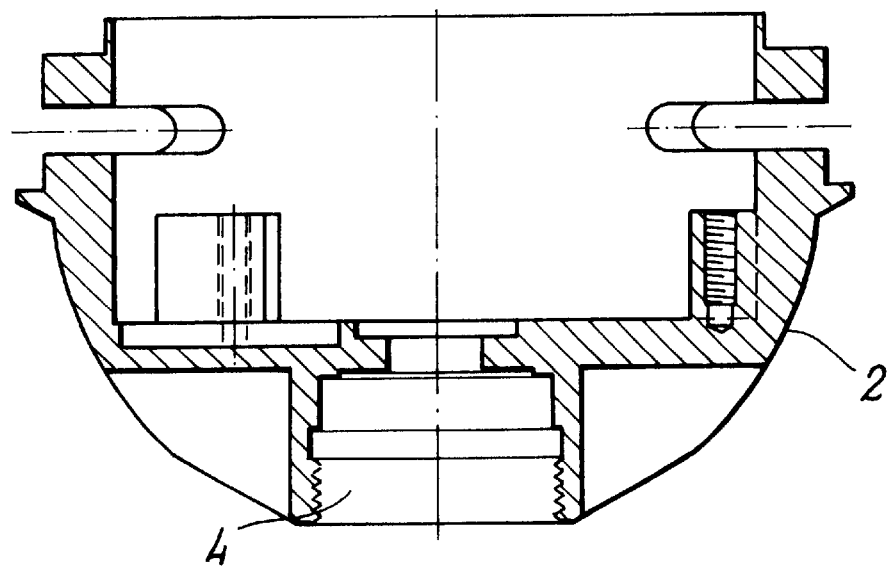
FIG. 5 is a section view along line V—V of FIG. 4.

Said groups 10 comprise each one a series of overlapped lamellae (see particularly FIG. 2), spaced by spacers 11, in such a way that two contiguous lamellae have the same distance and can be inserted between the lamellae of the central group 8, and vice versa.

Said lamellae of the groups 10 are coupled to each other by two pins or rivets crossing them along an orthogonal direction, thus constituting a pack interposing with the disc shaped elements of the first group 8 during the movement of the groups 10, that will be described in greater detail in the following, said movement being assisted by a guide device.

Within the proof cup 2 a high viscosity siliconic fluid is contained, creating a resistance to the rotate motion of the second groups 10 with respect to the first group 8.

As already said, four groups 10, radially movable with respect to the axis 7.

The radial movement of the group 10 is obtained by two plates 13, 14, respectively upper and lower, enclosing each single group 10.

On the lower plate 13 is placed on a pin (not shown) flowing within the corresponding radial slot 15 obtained within the base of the cup 2.

Instead, on the upper plate 14 of each group 10 a guide pin is provided (not shown) sliding within a corresponding radial slot 17 obtained within the upper guide disc 18.

The slot 15 is comprised of a circular groove (of about 100°) that is placed in such a way that the difference between the initial position distance and the final position distance is identical to the stroke necessary to obtain that the laminar groups are completely engaged or disengaged with the fixed group; by position distance it is meant the distance between the rotation axis and the position of the guide pin of the lamellae group.

Practically, radial slots 15 oblige groups 10 to move radially with respect to the axis 7, while the guide disc 18, along with their shaped slots 17, oblige the pins of each group 10 to cover a radial trajectory following the rotate movement conferred from outside of the proof cup 2, cams 19 acting on said guide disc 18. Slots 17 will be realised in such a way to allow to the movable groups 10 during their radial movement with respect to the axis 7 to pass from a position where they do not have any interengagement with the lamellae of the fixed group 8, except for a minimum "starting" coupling, and a complete engagement position, thus obtaining a minimum resistance condition and a maximum resistance condition.

Obviously, as already said, the number of movable groups 10 can be different with respect to that of that of the present embodiment, the number of the guide slots 15 and 17 being equal to the number of movable groups 10.

Further, it is very important that all the movable groups 10, during their movement, maintain a uniform distance with respect to the rotation axis 7.

Said cams 19 are coupled with the guide disc 18 by two or more coupling elements 20.

As already said, in order to optimise the performances of the module 1 according to the invention, and to reach the maximum value of the resistance to the movement, the sum of the interfaced surfaces of the movable groups 10 will be the same of the interfaced surfaces of the fixed group 8, in such a way that when in the maximum coupling position, the outer profiles of the movable groups 10 coincide with the outer diameter of the fixed group 8.

Figure 6:
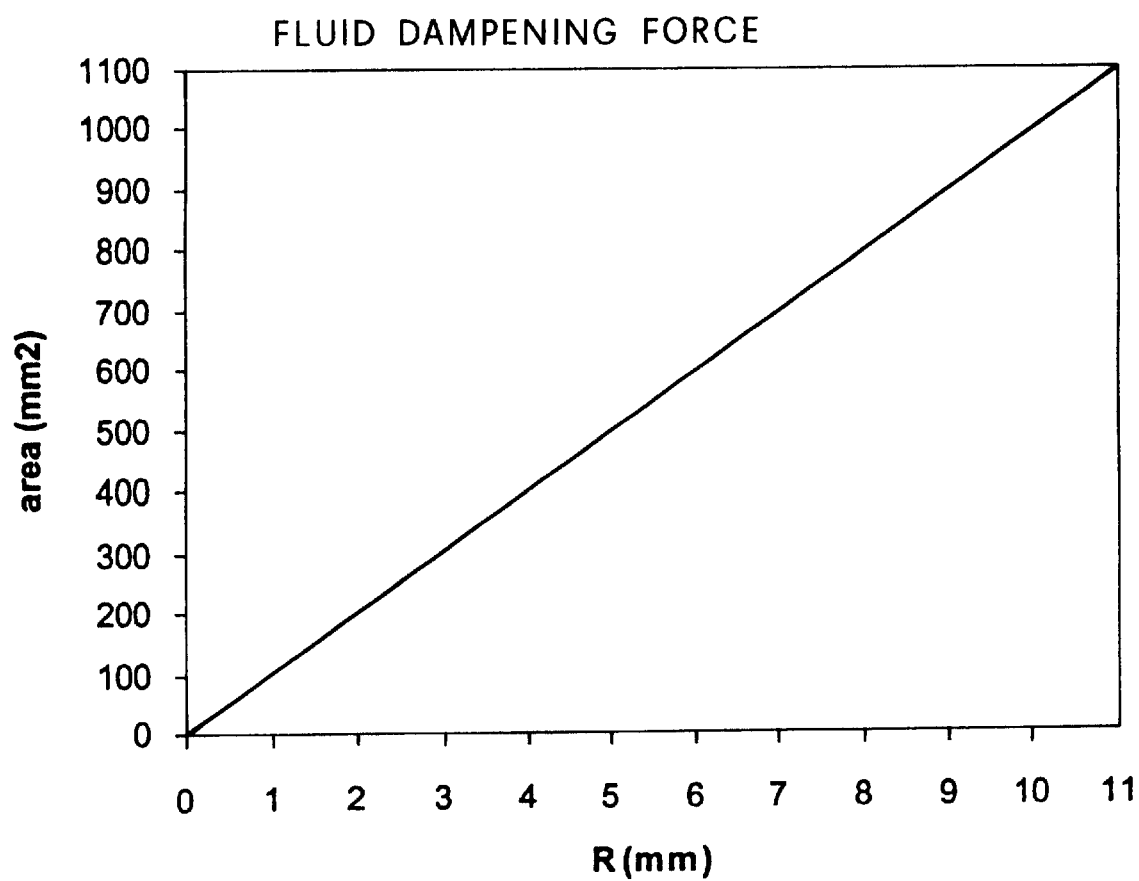
FIG. 6 shows a graph reproducing the characteristic curve of the intensity variation of the reaction force of the module according to the invention.

From FIG. 6, it can be noted the characteristic curve of the variation of the reaction force intensity of the module as a function of the "overlapping ray", the latter being the portion of the ray (and thus the surface) of the movable groups 10 that is overlapped with the ray of the fixed group 8 (during its movement).

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. Module for adjustment of intensity of panoramic movements along the horizontal and vertical plane, particularly in a supporting head for television or motion-picture cameras, characterised in that it comprises a proof casing, with a centrally passing rotation axis, a first group of fixed inner disc shape elements, coupled on said rotation axis and spaced each other by spacing means, at least two groups of movable, laminar, disc shaped elements, the elements of which are maintained spaced each other by further spacing means, said groups of movable, laminar, disc shaped elements being provided substantially externally with respect to said first group of elements, and being contemporaneously movable with respect to the latter group, symmetrically according to the radial direction with respect to the rotation axis, guide means for the movement of said two groups of movable, laminar, disc shaped elements, within said proof casing a fluid being provided creating a resistance to the movement of the movable groups with respect to the fixed group, said movable groups being able to reach, with respect to the fixed group, a completely disengaged position and a completely interengagement position of their disc shaped elements, wherein said guide means for the movable groups are comprised of two plates, respectively upper and lower plate, enclosing each single group, on the lower plate interference means, e.g. a pin, being provided, slidable along respective slots obtained on a lower disc, and on said upper plate interference means, e.g. a pin, being provided, slidable along respective slots, necessary to obtain radial movements.

2. The module for adjustment of intensity of panoramic movements according to claim 1, characterised in that said movable groups comprise a series of overlapped lamellae spaced by said spacing means, said lamellae being coupled by tow pins or rivets passing through a orthogonal direction in such a way to realise a completely rigid pack interengaging with the disc shaped elements of the fist group during their axial movement.

3. The module for adjustment of intensity of panoramic movements according to claim 1, wherein two, three, four or a higher number of moveable groups are provided, preferably four movable groups.

4. The module for adjustment of intensity of panoramic movements according to claim 1, wherein the fluid employed is a high viscosity siliconic fluid.

5. The module for adjustment of intensity of panoramic movements according to claim 1, such that during the movement, all the movable groups maintains the same distance from the rotation axis.

6. The module for adjustment of intensity of panoramic movements according to claim 1, wherein the movement of the movable groups is obtained by an outer cam connected with said upper guide disc by fixing elements.

7. The module for adjustment of intensity of panoramic movements according to claim 1, wherein order to optimise the performances and reach the maximum value of the resistance to the movement, the sum of the interfaced surfaces within the movable groups will be equal to the interfaced surface of the fixed group in such a way that in the position of maximum coupling, the outer profiles of the movable groups will coincide with the outer diameter of the fixed group.

8. Module for adjustment of intensity of panoramic movements along the horizontal and vertical plane, particularly in a supporting head for television or motion-picture cameras, characterised in that it comprises a proof casing, with a centrally passing rotation axis, a first group of fixed inner disc shape elements, coupled on said rotation axis and spaced each other by spacing means, at least two groups of movable, laminar, disc shaped elements, the elements of which are maintained spaced each other by further spacing means, said groups of movable, laminar, disc shaped elements being provided substantially externally with respect to said first group of elements, and being contemporaneously movable with respect to the latter completely interengagement position of their disc shaped elements, wherein the movement of the movable groups is obtained by an outer cam connected with an upper guide disc by fixing elements.

9. The module for adjustment of intensity of panoramic movements according to claim 6, characterised in that said movable groups comprise a series of overlapped lamellae spaced by said spacing means, said lamellae being coupled by tow pins or rivets passing through a orthogonal direction in such a way to realize a completely rigid pack interengaging with the disc shaped elements of the fist group during their axial movement.

10. The module for adjustment of intensity of panoramic movements according to claim 6, wherein two, three, four or a higher number of moveable groups are provided, preferably four movable groups.

11. The module for adjustment of intensity of panoramic movements according to claim 6, wherein the fluid employed is a high viscosity siliconic fluid.

12. The module for adjustment of intensity of panoramic movements according to claim 6, wherein said guide means for the movable groups are comprised of two plates, respectively upper and lower plate, enclosing each single group, on the lower plate interference means, e.g. a pin, being provided, slidable along respective slots obtained on a lower disc, and on said upper plate interference means, e.g. a pin, being provided, slidable along respective slots, necessary to obtain radial movements.

13. The module for adjustment of intensity of panoramic movements according to claim 6, such that during the movement, all the movable groups maintains the same distance from the rotation axis.

14. The module for adjustment of intensity of panoramic movements according to claim 6, wherein the movement of the movable groups is obtained by an outer cam connected with said upper guide disc by fixing elements.

15. The module for adjustment of intensity of panoramic movements according to claim 6, wherein order to optimise the performances and reach the maximum value of the resistance to the movement, the sum of the interfaced surfaces within the movable groups will be equal to the interfaced surface of the fixed group in such a way that in the position of maximum coupling, the outer profiles of the movable groups will coincide with the outer diameter of the fixed group.

* * * * *